Sept. 8, 1936. W. PATERSON 2,053,628
IMPROVED FILTERING APPARATUS AND METHOD
Filed Dec. 9, 1933 2 Sheets-Sheet 1

W. Paterson
INVENTOR

Patented Sept. 8, 1936

2,053,628

UNITED STATES PATENT OFFICE 2,053,628

IMPROVED FILTERING APPARATUS AND METHOD

William Paterson, London, England

Application December 9, 1933, Serial No. 701,682
In Great Britain December 10, 1932

8 Claims. (Cl. 210—130)

This invention relates to apparatus for the filtration of liquids of the kind involving a quartz sand or like filter bed which requires to be cleansed from time to time by the flotation of the bed by passing wash water therethrough in an upward direction with or without agitation of the bed by compressed air.

The wash water should be applied at a rate sufficiently high to entirely float the bed which subsequently settles back with a re-arrangement of the sand grains, and during this process the bed expands it may be by as much as 50 per cent. with the result that the lip of the waste trough or outlet through which the waste wash water escapes must be high enough to permit of this expansion without wastage of the sand grains.

To permit of this expansion of the filter bed without incurring the risk of the sand grains being carried over with the waste water into the waste trough or outlet it is necessary that the lip of this waste outlet should be about 18" to 24" above the level of the sand bed, consequently this depth of water remains above the filter surface after the cleansing process and on occasion contains a considerable amount of suspended matter. Also a greater amount of water is required to lift the sediment to so great a distance above the surface of the sand bed for discharge to waste.

One object of the present invention is to provide means for removing this water from above the filter bed to the waste outlet without fear of loss of the filtering medium. Attempts have been made to permit of this by the installation of discharge siphons connecting the water in the filter bed with the waste channel, but it has been found that these siphons may be operated during a period when the filtering medium is in suspension, with its consequent loss. The present invention avoids this difficulty by providing with each siphon means by which the siphon may be put into and out of operation at any time as and when required.

Another object of my invention is to save wash arrangements hereinafter described or indicated. laden water from a relatively short distance above the sand bed.

The invention also comprises utilizing the siphon or siphons for the ingress of raw water to the filter bed without the fear of disturbance.

The invention also comprises other details and arrangements hereinafter described or inidicated.

The accompanying drawings illustrate several modes of carrying out the invention.

In carrying my invention into effect in one convenient manner I construct my improved filter generally upon conventional lines. Between the waste channel $a$ and the filter bed $b$ I form a ferro-concrete, earthenware or other wall $c$ of suitable height to permit the expansion of the filter bed during cleansing and within or upon such wall I provide one or more siphon passages or openings $d$ leading from a point just above the filter bed over the division wall and to the waste channel.

Figure 1:
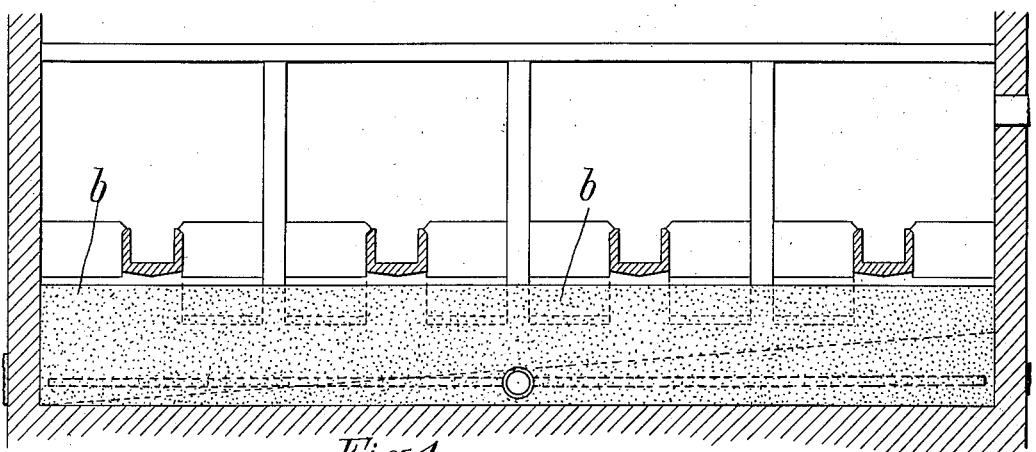
Figure 1 is a cross-sectional elevation of a part of a filter plant in accordance with the invention.
Figure 2:
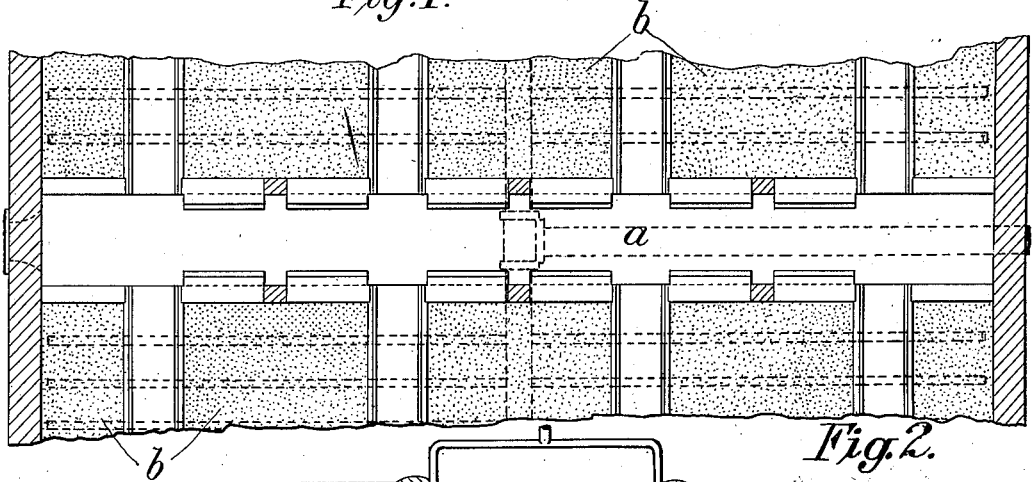
Figure 2 is a plan of Figure 1.
Figure 3:
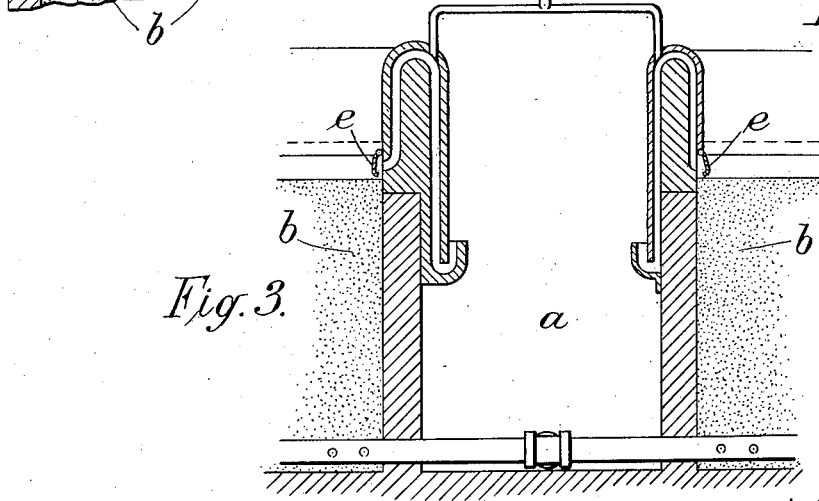
Figures 3 to 5 are sectional elevations showing four different siphon arrangements in accordance with the invention.
Figure 4:
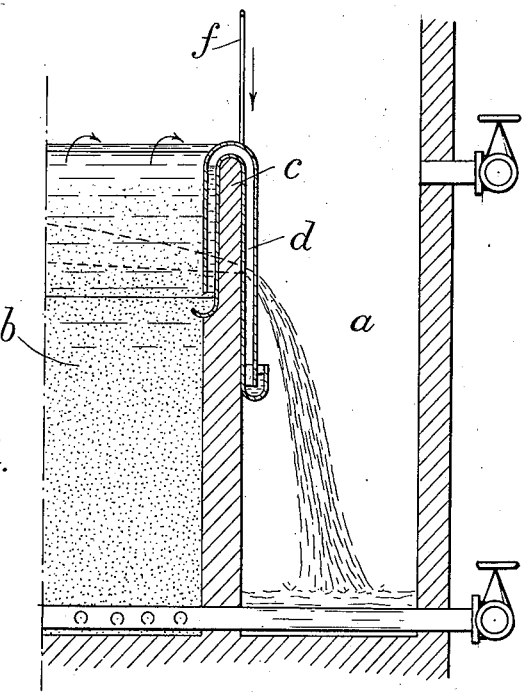
Figure 5:
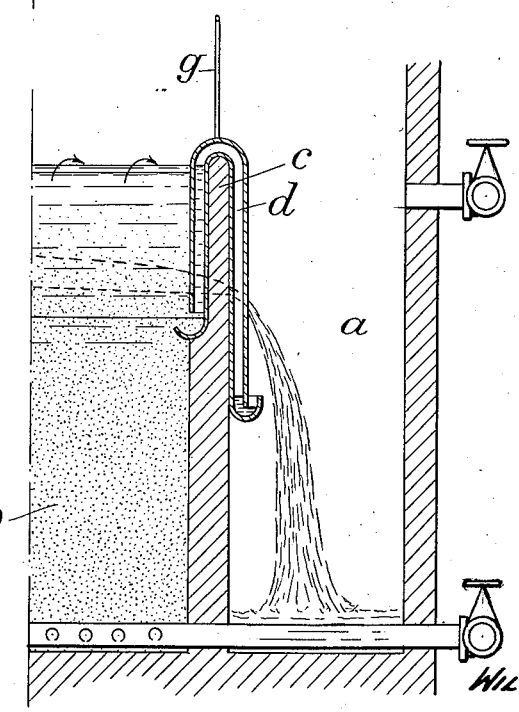

Such siphon opening or openings may be superimposed upon the division wall as shown in Figures 4 and 5 or may be formed by appropriately moulding the wall or by the use of earthenware or like blocks in the construction of the wall as shown in the left-hand part of Figure 3, or in some cases they may be formed by suitably shaping the wall in the solid and covering the same with a metallic or other shroud to provide the siphon passage, as shown in the right-hand part of Figure 3.

The inlet water is arranged to enter the filter through the waste channel $a$ in which it rises until it overflows through the siphonic dividing wall into the filter gradually filling up above the filter bed until the water covers the top of the dividing wall whereupon the water level will rise equally in both the waste channel and filter and the filtering process can be put into operation.

When it is desired to cleanse the filter the inlet valve is shut and the waste valve opened whereupon the water level in the filter falls until it reaches the top of the dividing wall between the waste channel and filter and further lowering of the water in the waste channel starts the siphon into operation and drains the water through the siphonic wall to within a few inches of the bed when the siphon breaks and the bed may be thoroughly agitated by the application of a reverse current of wash water with or without the application of compressed air.

The necessary expansion of the bed can be effected without fear of wastage of the sand or of the water being drawn off to waste until the level rises sufficiently to bring the siphon again into action at which time the rate of application of wash water may be so reduced as to allow the bed to settle and permit the siphon to draw off the remainder of the waste water. The waste valve may then be closed and the inlet valve opened permitting the water to enter the filter as before and the filtering process can then proceed.

This procedure necessitates the closing down of the wash water valve so that the bed is not in suspension when the draw-off siphon starts into operation; otherwise a considerable portion of the sand would be drawn to waste. According to this invention I provide simple and effective means for ensuring that the siphon overflow is inoperative during this period. For example, I may provide each siphon inlet and/or outlet with a flap-door or valve e (Figure 3) but as this entails the manipulation of a number of mechanical parts I prefer to provide pneumatic means for the purpose. For example, as shown in Figure 4, I arrange the spill-over of the siphon at the same level as the lip of the dividing wall and I arrange to admit compressed air at the crown of the siphon (as by the pipe f) so as to depress the water level below that of the water spilling over into the waste channel during the flotation of the bed with wash water. The spill-over level of the waste channel permits full expansion without fear of wastage, the siphons having been rendered inoperative by the ingress of compressed air to the crown of the siphons. When the wash water has been shut off and the bed settles back into position, the compressed air on the crown of the siphons is released and they immediately start into operation, drawing off the water above the filter bed with all the impurities which have been thrown into suspension.

I may control the small supply of compressed air to the crowns of the siphons by the wash water valve or its operating means, so that the turning on of the wash water, which throws the filtering medium into suspension, at the same time turns on the compressed air to render the siphons inoperative, the closing down of the wash water valve permitting the settlement of the sand bed and at the same time effecting the release of the compressed air and bringing the siphons into action.

In place of having the siphon situated at such a level that it would become operative when the water reached the level at the lip of the waste trough, but for the provision of the compressed air just referred to, I may arrange the siphon as shown in Figure 5 so that the overflow is too high above the lip of the waste trough to permit its functioning when this level is reached. I arrange for its being put into operation by connecting the crown of the siphon (as by the pipe g) to a partial vacuum which abstracts the air so raising the water to a level which puts the siphon into operation. The partial vacuum may be obtained in any convenient manner as by connecting to a vacuum pump, ejector, or vacuum chamber.

When the arrangement shown in Figure 3 is adopted I may arrange that the closing of the door or flap may be effected at will with hand means or automatically by the turning on of the wash water or of the air when such is applied.

In some cases I may arrange the siphon spill-over in relation to the water levels that the siphon is prevented from operating by air trapped in the crown of the siphon and I provide controlled means for releasing such air so as to put the siphon into operation.

Having now described my invention, what I claim as new and desire to secure by Letters Patent is:—

1. Filtering apparatus comprising a filter bed, a chamber above said bed, a waste outlet, a siphon member leading from said chamber and discharging to said outlet, said siphon having a liquid seal on its discharge end and its inlet end opening directly into said chamber and just above the unexpanded bed surface, so that all wash liquid discharged from said chamber by said syphon is drawn from immediately above said surface, and means for admitting fluid to or exhausting it from the crest of the siphon and cooperating with said seal for putting said siphon into and out of operation.

2. Filtering apparatus comprising a filter bed, a chamber over said bed, a waste outlet, means for directing a rapid upward flow of wash water through the filter bed into the chamber to expand and cleanse the bed, means adapted to subsequently remove the wash water from and to a level just above the normal bed surface, said means comprising a siphon member with its inlet end opening immediately and unobstructedly closely adjacent the unexpanded bed surface and a liquid seal on its outlet, and means for admitting fluid to or exhausting it from the crest of the siphon and cooperating with said seal whereby flow through said siphon may be inhibited during the period of said wash flow and permitted subsequently.

3. Filtering apparatus comprising a filter bed, a waste outlet, a wall dividing said bed from said outlet and extending above said bed, means for directing a flow of wash water upwardly through said bed to expand and cleanse same, and means for subsequently removing the wash water from immediately above the unexpanded bed surface and discharging it to the waste outlet, said last named means comprising a siphon member having its inlet end opening directly and unobstructedly just above the normal bed level, said siphon being of substantially uniform cross-sectional area and without obstruction to flow through its length, and means for admitting fluid to or exhausting it from the crest of the siphon and putting the siphon into and out of operation as and when required, said last named means including a liquid seal on said siphon.

4. A plurality of filter beds and walls forming channels between said filter beds, means for admitting water into said channels and for controlling flow through waste pipes leading therefrom, siphons leading from just above the filter beds over the walls into the channels to a point lower than the top of the filter beds, said siphons forming passages whereby water entering the channel may flow in over the top wall to above the filter bed or outwardly over the wall from above the bed to the channel.

5. The method of cleansing a granular filter bed which comprises the steps of flowing wash water upwardly therethrough at a high rate to suspend the bed and impurities reducing the flow of wash water to allow particles forming the bed to subside and then removing the supernatant turbid liquid by siphonic action, the liquid being drawn from a fixed level just above the bed, starting and stopping of the siphon flow being obtained by pneumatic action only.

6. The method of operating a water filter having a granular filter bed that is enclosed by side walls, comprising the following steps, passing the water downward through the bed, during the filtering phase drawing down the supernatant water just prior to washing the bed to a level adjacent the surface of the bed, and effecting the cleansing by first rapidly flowing water upward through the bed at such velocity as to materially expand and suspend the bed and to suspend collected impurities, then reducing the upward flow to allow the bed particles to subside and then rapidly withdrawing the turbid water from a fixed level just above the bed surface by siphonic action, there being no material escape of wash water from above the bed during the period of the rapid wash flow.

7. The process of claim 6 wherein the upward flow of wash water is greatly diminished during the period of siphonic action but some wash upflow retained during such period to prevent subsidence of impurities on to the bed surface.

8. Filtering apparatus comprising a granular filter bed, walls enclosing the sides of said bed and extending above the normal bed surface to form a chamber over the bed, means for delivering an upward flow of wash water through the bed into the chamber and means for retaining the wash water in the chamber during the period of wash flow and for subsequently discharging same, said last named means comprising a fixed siphon member having its inlet end opening unobstructedly just above the bed and its discharge end at a lower level without said walls, said discharge end being provided with a liquid seal, and means for admitting fluid to or exhausting it from the crest of the siphon and cooperating with said seal for inhibiting or permitting flow through said siphon by controlling the air pressure within the siphon.

WILLIAM PATERSON.